(12) United States Patent
Suzuki et al.

(10) Patent No.: US 7,151,333 B2
(45) Date of Patent: Dec. 19, 2006

(54) ACTUATOR PROVIDED WITH GROUNDING TERMINAL

(75) Inventors: Yuzuru Suzuki, Shizuoka (JP); Naoyuki Harada, Shizuoka (JP); Kazuo Muramatsu, Shizuoka (JP)

(73) Assignee: Minebea Co., Ltd., Kitasaku-gun (JP)

( * ) Notice: Subject to any disclaimer, the term of this patent is extended or adjusted under 35 U.S.C. 154(b) by 0 days.

(21) Appl. No.: 11/150,091

(22) Filed: Jun. 13, 2005

(65) Prior Publication Data

US 2005/0275297 A1 Dec. 15, 2005

(30) Foreign Application Priority Data

Jun. 14, 2004 (JP) .............................. 2004-175389

(51) Int. Cl.
 *H02K 5/00* (2006.01)
(52) U.S. Cl. .......................................... 310/71; 310/89
(58) Field of Classification Search .................. 310/51, 310/71, 68 R, 89, 179, 254
See application file for complete search history.

(56) References Cited

U.S. PATENT DOCUMENTS

| | | | | |
|---|---|---|---|---|
| 6,528,913 B1 * | 3/2003 | Michaels | ....................... | 310/71 |
| 6,617,719 B1 * | 9/2003 | Sunaga et al. | .................. | 310/64 |
| 6,674,196 B1 * | 1/2004 | Ibata | ............................ | 310/81 |
| 6,740,999 B1 * | 5/2004 | Segawa | ........................ | 310/81 |
| 6,836,038 B1 * | 12/2004 | Noda et al. | .................... | 310/71 |
| 6,954,015 B1 * | 10/2005 | Segawa | ........................ | 310/71 |
| 6,987,338 B1 * | 1/2006 | Lavasser et al. | ............... | 310/71 |
| 7,021,973 B1 * | 4/2006 | Morikaku et al. | ........... | 439/709 |
| 2001/0017495 A1 * | 8/2001 | Sato et al. | ................. | 310/67 R |
| 2001/0026103 A1 * | 10/2001 | Suzuki et al. | .................. | 310/71 |
| 2004/0046465 A1 * | 3/2004 | Murakami et al. | ............ | 310/71 |
| 2004/0066103 A1 * | 4/2004 | Ohuchi et al. | ................. | 310/71 |

FOREIGN PATENT DOCUMENTS

| | | |
|---|---|---|
| JP | 6-28448 U | 4/1994 |
| JP | 7-87696 A | 3/1995 |
| JP | 2002-122203 A | 4/2002 |

* cited by examiner

*Primary Examiner*—Thanh Lam
(74) *Attorney, Agent, or Firm*—Foley & Lardner LLP

(57) ABSTRACT

There is provided an actuator which includes: a stator assembly including a pair of stator yokes, and a coil disposed between the pair of stator yokes; a rotor unit including a magnet at its outer circumference and disposed inside the stator assembly; an output shaft disposed inside the rotor unit; a housing; a front plate disposed between the stator assembly and the housing; a printed board having a land portion leading to a grounding wire; and a grounding terminal having electrical conductivity and elasticity and disposed between the stator assembly and the housing. One end portion of the grounding terminal makes contact with one of the pair of stator yokes, and the other end portion thereof makes connection to the land portion of the printed board, whereby static electricity and electromagnetic noises generated in the stator assembly are conducted to the grounding wire.

7 Claims, 7 Drawing Sheets

ACTUATOR PROVIDED WITH GROUNDING TERMINAL

BACKGROUND OF THE INVENTION

1. Field of the Invention

The present invention relates to an actuator, and more particularly to an actuator which is free from electrostatic charge and from effects of external noises.

2. Description of the Related Art

Stepping motors are conveniently and well controllable and are used in various audio visual and office automation equipments. Especially, a permanent magnet (PM) stepping motor is low in cost, and therefore, recently, part of the PM stepping motor is utilized to structure an actuator, in which the rotary motion of a rotor is converted into the linear motion of an output shaft (hereinafter such an actuator is referred to as a "PM motor type actuator"). In the PM motor type actuator, a rotary-to-linear motion mechanism, which is not found in a motor structure, is provided between an output shaft (corresponding to a rotary shaft of a motor) and a mold resin portion as a sleeve having a magnet fixed thereon, whereby the rotary motion of the magnet and the mold resin portion is converted into the linear motion of the output shaft. Such an actuator is used to activate a headlamp optical axis control unit in a vehicle, a gas flow amount control valve, and the like.

FIG. 7 is a cross sectional view of one type of PM motor type actuator 100 (refer to, for example, Japanese Patent Application Laid-Open No. 2002-122203). The actuator 100 generally comprises a stator assembly 101, a rotor unit 110, an output shaft 113, and a housing 118.

The stator assembly 101 includes stator units 101a and 101b coupled to each other. The stator unit 101a includes outer and inner stator yokes 102a and 103a made of a soft-magnetic steel plate and having a plurality of pole teeth 105a arranged in a comb-like configuration, and a coil 104a disposed between the outer and stator yokes 102a and 103a. In the same way, the stator unit 101b includes outer and inner stator yokes 102b and 103b with a plurality of pole teeth 105b, and a coil 104b. The first stator unit 101a is stacked on the second stator unit 101b, and the first and the second stator units 101a and 101b thus combined are fixedly coupled together by resin injection molding. A front plate 117 having, at its outer circumference, claws for catching the housing 118 is attached to the first stator unit 101a, thus completing the stator assembly 101.

The rotor unit 110 includes a magnet 111, and a mold resin portion 120 having a ring-like nut portion 112. The magnet 111 is shaped into a hollow cylinder, fixedly attached onto the mold resin portion 120, and is disposed inside the stator assembly 101 so as to oppose the pole teeth 105a and 105b of the stator yokes 102a, 103a, 102b and 103b with a gap therebetween. The mold resin portion 120 is formed into a cylindrical configuration by resin injection molding, has the nut portion 112 disposed therein, and has the magnet 111 disposed at its outer circumference. The both axial ends of the mold resin portion 120 are rotatably supported by respective bearings fitted to the housing 118 and a rear cap.

The output shaft 113 has a head 116 attached at one end portion thereof exposed, has a screw portion (male screw) 114 formed on the other end portion thereof enclosed, and has a rotation stopper pin 115 inserted through the middle portion thereof orthogonally thereto and engaging with axially extending grooves formed inside the housing 118 so as to be axially movable and circumferentially immovable.

A rotary-to-linear motion mechanism comprises the nut portion 112 of the rotor unit 110 and the screw portion 114 of the output shaft 113, wherein the nut portion 112 engages threadedly with the screw portion 114 so that the rotary motion of the rotor unit 110 is converted into the axial motion of the output shaft 113.

The housing 118 has the aforementioned axially extending grooves for accommodating the rotation stopper pin 115 and is structured so as to appropriately position the stator assembly 101 and the rotor unit 110. The rotor unit 110 is put in the stator assembly 101, then the housing 118 is put over the stator assembly 101 and the rotor unit 110, and the claws of the front plate 117 are bent up so as to rigidly catch the housing 117.

The actuator 100 structured above operates as follows. When current is applied to the coils 104a and 104b, the rotor unit 110 is caused to rotate by magnetic attraction and repulsion generated between the coils 104a and 104b and the magnet 111, and the output shaft 113, which is prohibited from rotating by the rotation stopper pin 115 accommodated in the grooves of the housing 118, is caused to linearly move in the axial direction by the rotary-to-linear motion mechanism, specifically the nut portion 112 and the screw portion 114 threadedly engaging each other.

Recently, reduction in dimension, weight and also cost is increasingly requested, and in order to meet the request, an engineering plastic which is favorable for weight and cost reduction is often used for the mold resin portion 120 of the rotor unit 110, the head 116 attached to the tip end of the output shaft 113, the resin for injection molding of the stator assembly 101, and the like. An actuator using an engineering plastic as described above is apt to be electrostatically charged, and electronic parts may possibly suffer electrostatic destruction. Also, importance is being put on electromagnetic environment in equipments and systems, and noise issues, such as EMC and EMI must be carefully considered.

If an actuator is attached by metallic screws to a metallic chassis of an equipment, then static electricity and electromagnetic noise generated in the actuator are caused to flow, via the metallic screws, easily into a chassis grounded, thus preventing electrostatic charge and electromagnetic noise problem.

On the other hand, recently, the chassis of the equipment to which the actuator is attached is often made of an engineering plastic for reduction in weight and cost, and also for better productivity. The engineering plastic is light and strong but not electrically conductive therefore failing to conduct static electricity and electromagnetic noise generated in the actuator into the chassis.

This problem is solved by providing a grounding pattern used in, for example, a molded motor. Specifically, a grounding pattern formed on a printed board is made electrically continuous with a stator via screws made of an electrically conductive material, and a lead wire as a grounding wire is connected to the grounding pattern (refer to, for example, Japanese Patent Application Laid-Open No. H07-087696).

Also, in case of a solenoid valve on a vehicle, one end of a conductive clamp is welded to the outer circumference of a body case, and the other end thereof is crimped onto a grounding terminal (refer to, for example, Japanese Utility Model Application Laid-Open No. 06-028448).

The above solutions, however, have the following problems.

In the solution described with reference to the Japanese Patent Application Laid-Open No. H07-087696, the grounding pattern must be formed on the printed board, and an appropriate structure is required for duly connecting the grounding pattern to the stator by the conductive screws. Also, a screwing-up process is required thus deteriorating workability.

In the solution described with reference to the Japanese Utility Model Application Laid-Open No. H06-028448, the welding and crimping works result in deteriorated workability.

SUMMARY OF THE INVENTION

An object of an illustrative, non-limiting embodiment of the present invention is to overcome the disadvantage described above, and to provide an actuator which is prevented from getting electrostatically charged and having effects of noises. Also, the present invention is not required to overcome the disadvantage described above, and an illustrative, non-limiting embodiment of the present invention may overcome a different disadvantage or may not overcome any disadvantages.

In order to achieve the object described above, according to an illustrative, non-limiting aspect of the present invention, there is provided an actuator which comprises: a stator assembly including a pair of stator yokes each having a plurality of pole teeth at an inner circumference thereof, and a coil comprising a wound magnet wire and disposed between the pair of stator yokes; a rotor unit including a magnet at an outer circumference thereof, and disposed inside the stator assembly such that the magnet opposes the pole teeth of the stator assembly with a gap therebetween; an output shaft disposed inside the rotor unit; a housing; a front plate disposed between the stator assembly and the housing; a printed board having a land portion leading to a grounding wire; and a grounding terminal having electrical conductivity and elasticity, and disposed between the stator assembly and the housing. In the actuator described above, one end portion of the grounding terminal makes contact with one stator yoke of the pair of stator yokes located closer to the housing, and the other end portion thereof is connected to the land portion of the printed board. Consequently, even if the actuator is attached to a chassis comprising a nonconductive material, such as plastic, static electricity in the stator assembly and electromagnetic noises can be conducted to the grounding wire through the grounding terminal. This provides a lot of options in selecting a material for a chassis of an equipment.

In the aspect of the present invention, the grounding terminal may be an electrically conductive and elastic plate, and may comprise: a flat portion; a curved portion continuous from one end of the flat portion, and adapted to make contact with the one stator yoke located closer to the housing; an extension portion perpendicularly continuous from the other end of the flat portion; and positioning portions perpendicularly continuous from respective both sides of the flat portion (that is, the positioning portions comprises a first positioning portion and a second positioning portion, wherein the first positioning portion is perpendicularly continuous from one side of the flat portion, and the second positioning portion is perpendicularly continuous from the other side of the flat portion), and the extension portion and the positioning portions, together with a part of the flat portion (i.e., the flat portion among the extension portion and the positioning portions), may snap-fittingly receive the printed board such that the extension portion makes connection to the land portion of the printed board. Accordingly, the grounding terminal and the printed board can be connected to each other firmly and easily, and soldering work at the land portion can be easily done.

In the aspect of the present invention, the curved portion may comprise at least two segments each having either U-shape or V-shape configurations. Consequently, the grounding terminal has an increased number of contact points with the stator yoke for better connection.

In the aspect of the present invention, the grounding terminal may have a slit which separates the curved portion into two sections, and which causes the flat portion to comprise three sections (a first section, a second section, and a third section). The first and second sections are separated from each other with the third section connecting to the first and second sections. Consequently, the ground terminal can be flexibly deformed under space and geometry constraints so as to achieve appropriate contact with the stator yoke.

In the aspect of the present invention, the grounding terminal may be an electrically conductive and elastic plate, and may comprise: at least two flat portions; at least one upright portion each bridging two adjacent flat portions of the at least two flat portions; a curved portion continuous from an end of one flat portion (a first flat portion) of the at least two flat portions, and adapted to make contact with the one stator yoke located closer to the housing; and an extension portion perpendicularly continuous from an end of another flat portion (a second flat portion) of the at least two flat portions, and the extension portion and one upright portion of the at least one upright portion located closer to the extension portion, together with the another flat portion, may snap-fittingly receive the printed board such that the extension portion makes connection to the land portion of the printed board. Accordingly, the grounding terminal and the printed board can be connected to each other firmly and easily, and soldering work at the land portion can be easily done.

In the aspect of the present invention, the grounding wire connected to the land portion of the printed board and signal lines may be twisted together. With this simple structure, the signal lines are effectively shielded thereby preventing pickup of noises.

In the aspect of the present invention, the grounding terminal may be disposed within a void portion of the front plate so as to be duly accommodated between the stator assembly and the housing. Accordingly, the outside dimension of the actuator is not influenced.

DETAILED DESCRIPTION OF THE EMBODIMENT

An exemplary embodiment of the present invention will hereinafter be described with reference to the accompanying drawings.

Figure 1:
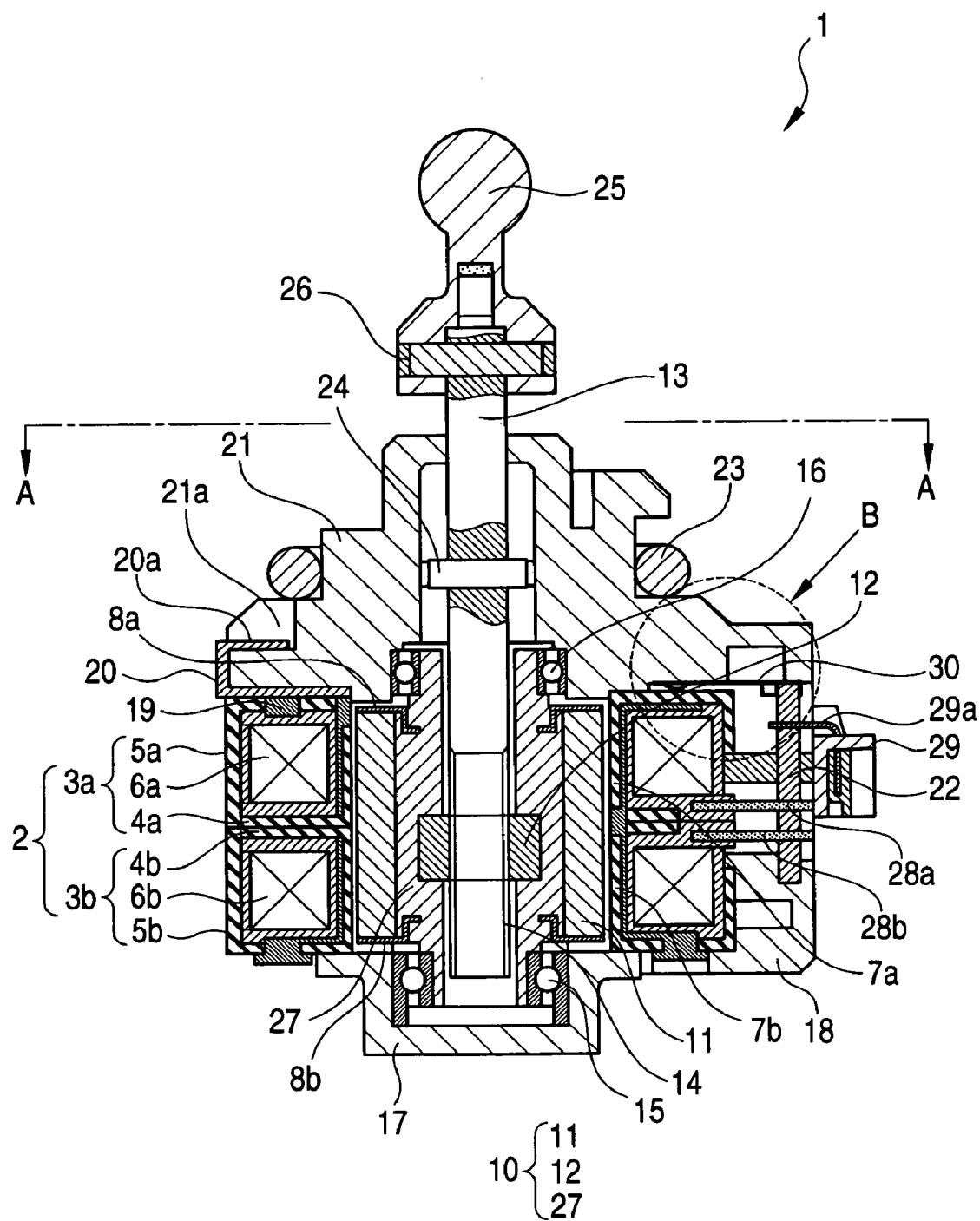
FIG. 1 is a cross sectional view of an actuator according to an illustrative, non-limiting embodiment of the present invention.

Referring to FIG. 1, an actuator 1 according to an exemplary embodiment of the present invention, which is a PM motor type actuator using a PM stepping motor, generally comprises a stator assembly 2, a rotor unit 10, an output shaft 13, and a housing 21.

The stator assembly 2 is generally structured such that a first stator unit 3a is stacked on a second stator unit 3b, and the first and second stator units 3a and 3b thus combined are fixed together by resin injection molding.

The first stator unit 3a includes inner and outer stator yokes 4a and 5a each having a plurality of pole teeth 7a, 7a, and a coil 6a disposed between the inner and outer stator yokes 4a and 5a. The second stator unit 3b includes inner and outer stator yokes 4b and 5b each having a plurality of pole teeth 7b, and a coil 6b disposed between the inner and outer stator yokes 4b and 5b. The inner and outer stator yokes 4a and 5a/4b and 5b are made of a soft-magnetic steel plate, for example, an electrogalvanized steel plate (SECC), and are shaped into a ring-like configuration, and the pole teeth 7a/7b are formed at the inner circumference of the stator yokes 4a and 5a/4b and 4b. Respective pole teeth 7a, 7a of the inner and outer stator yokes 4a and 5a intermesh with each other and are shifted from each other with a phase-difference of 180 degrees in terms of electrical angle, and also respective pole teeth 7b, 7b of the inner and outer stator yokes 4b and 5b intermesh with each other and are shifted from each other with a phase-difference of 180 degrees in terms of electrical angle.

The first and second stator units 3a and 3b structured above are put in a mold (not shown) and set to be shifted from each other with a phase-difference of 90 degrees in terms of electrical angle, and resin, for example, polybutylene terephthalate (PBT) is injected into the mold (not shown). The resin injected for the molding process fills up gaps at the pole teeth 7a and 7b, and also integrally forms a rear plate 17 adapted to lodge a bearing 15, and upper bosses 19. Thus, the stator assembly 2 is mostly completed.

Figure 2:
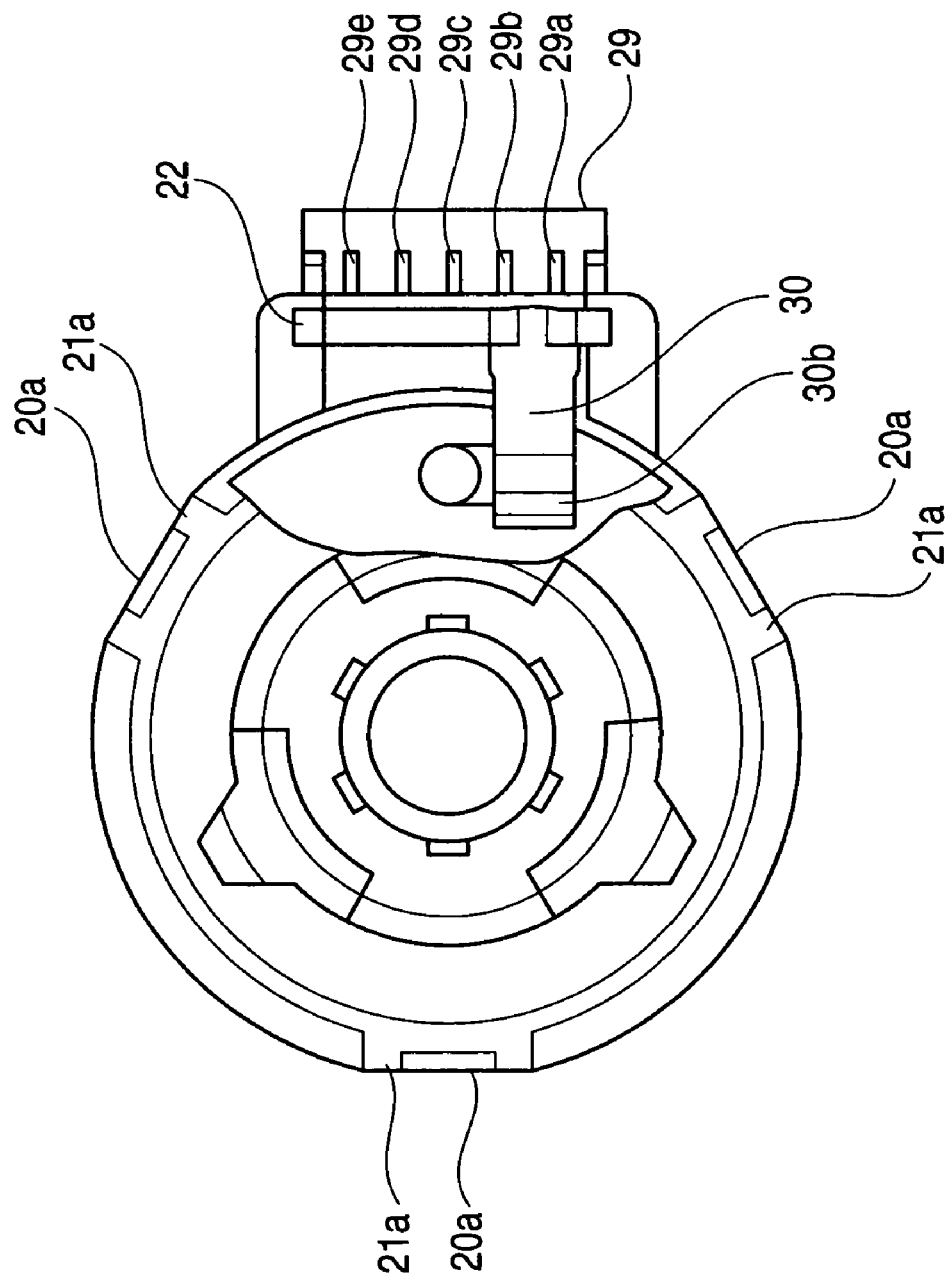
FIG. 2 is a top plan view of the actuator of FIG. 1, sectioned along line A—A.

The stator assembly 2 further includes a front plate 20 having a plurality of claws 20a formed at an outer circumference thereof as shown in FIG. 2. The front plate 20 is put on the first stator unit 3a, duly positioned to the upper bosses 19 and fixedly attached by welding, or the like to the outer stator yoke 5a of the first stator unit 3a, and the claws 20a are bent up to catch the housing 21 (to be described later) which is put on the front plate 20. The front plate 20 is made of a soft-magnetic material, for example, an electrogalvanized steel plate (SECC), but may alternatively be made of any structural material, such as a silicon steel plate, an electromagnetic soft steel plate (SUY), and a stainless steel plate (SUS).

The rotor unit 10 includes a nut portion 12, a mold resin portion 27, and a magnet 11. The magnet 11 is shaped into a circular hollow-cylinder having such an outer diameter as to make its outer circumferential surface oppose the pole teeth 7a and 7b with a gap therebetween, and is fixedly disposed at the mold resin portion 27. The mold resin portion 27 is formed of a resin material, such as an engineering plastic, shaped into a circular hollow-cylinder having such an inner diameter as to allow the output shaft 13 to freely go therethrough, has the nut portion 12 fixedly disposed at the middle of the inner circumference, and has the magnet 11 fixedly disposed at the outer circumference. The both axial ends of the mold resin portion 27 are rotatably supported by the aforementioned bearing 15 disposed at the rear plate 17 and a bearing 16 disposed at the housing 21. Magnet stoppers 8a and 8b made of metal are disposed at respective ends of the magnet 11. The magnet stoppers 8a and 8b are implanted when the mold resin portion 27 is formed by resin injection molding, and function to prevent chipping of the magnet 11 and to better hold the magnet 11. The magnet 11, the nut portion 12, and the mold resin portion 27 are put together as an integral unit when the mold resin portion 27 is formed by resin injection molding. Resin used for injection molding is preferably PBT. The nut portion 12 is formed of a metallic or resin material, and has a female screw formed on its inner circumference.

The output shaft 13 has one end portion exposed and having a diameter smaller than that of the remaining portion thereof, and a head 25 is attached to the one end portion by means of a pin 26. A male screw portion 14 is formed toward the other end portion of the output shaft 13, and a rotation stopper pin 24 is inserted through the middle portion of the output shaft 13 orthogonally to the output shaft 13 and engages with axially extending grooves formed inside the housing 21 so as to be axially movable and circumferentially immovable. The axial dimension of the male screw portion 14 corresponds to the stroke length of the rotation stopper pin 24.

A rotary-to-linear motion mechanism includes the nut portion 12 of the rotor unit 10 and the male screw portion 14 of the output shaft 13 and structured such that the nut portion 12 has its female screw threadedly engaging with the male screw portion 14. When the mold resin portion 27 having the magnet 11 fixed thereto is rotated, the nut portion 12 fixed to the mold resin portion 27 is rotated together while retaining its axial position due to the mold resin portion 27 supported by the bearings 15 and 16, and the output shaft 13 having the head 25 on the exposed end portion is caused to linearly move in the axial direction by means of the rotary-to-linear motion mechanism. The rotary-to-linear motion mechanism does not have to be structured as described above, but may be structured otherwise as long as it functions applicably.

The housing 21 has the aforementioned axially extending grooves for slidably accommodating the rotation stopper pin 24, a recess for accommodating the bearing 16, a flat portion to oppose the magnet stopper 8a, a flat portion to make contact with the front plate 20 and a grounding terminal 30, a step portion to hold an O-ring 23 as a sealing means, and recesses 21a to receive the claws 20a of the front plate 20, and is structured so as to fixedly put the stator assembly 2 and the rotor unit 10 in position. The O-ring 23 attached at the step portion of the housing 21 has elasticity and functions to allow the actuator 1 to be rigidly attached to a chassis of an equipment (not shown).

After the rotor unit 10 is put in the stator assembly 2, the housing 21 is put over the stator assembly 2 and the rotor unit 10, and the claws 20a of the front plate 20 attached to the stator unit 3a are bent up to be hooked at the recesses 21a.

The actuator 1 operates as follows. When current is applied to the coils 6a and 6b, the rotor unit 10 is caused to rotate due to magnetic attraction and repulsion generated between the pole teeth 7a and 7b magnetized and the magnet 11. The output shaft 13 is prohibited from rotating by the rotation stopper pin 24 and is caused to linearly move in the axial direction by means of the rotor-to-linear motion mechanism composed of the nut portion 12 and the male screw portion 14.

Figure 7:
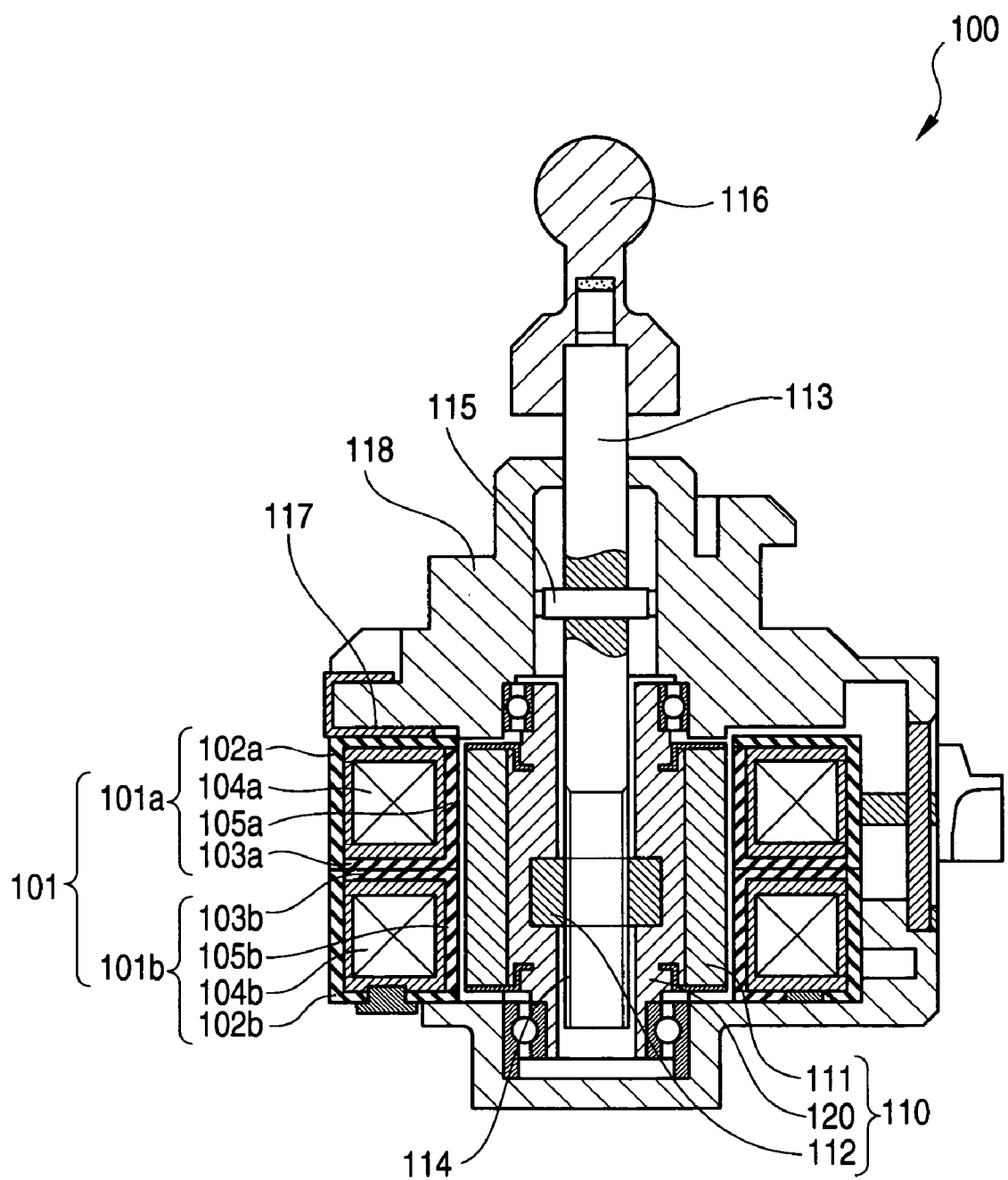
FIG. 7 is a cross sectional view of one type of actuator in the related art.

The actuator 1 according to the present invention is basically structured identical with the actuator 100 explained above with reference to FIG. 7 except the following.

The actuator 1, as shown in FIG. 1, includes a grounding terminal 30 disposed in a gap space which is present between the housing 21 and the outer stator yoke 5a of the stator unit 3a, and which has a dimension equal to the thickness of the front plate 20.

Figure 5A:
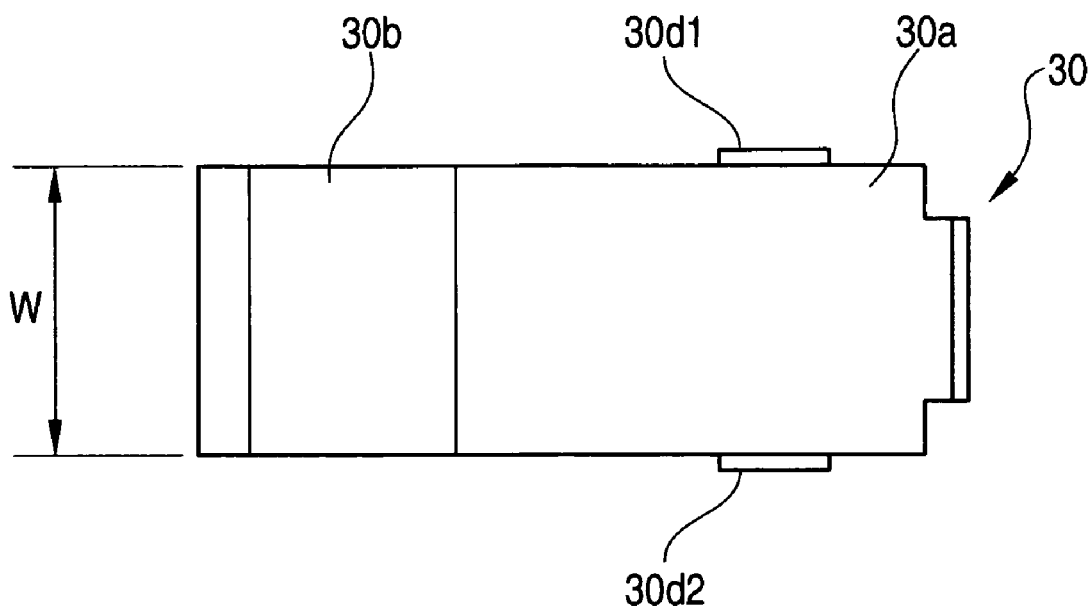
FIG. 5A is a plan view of a grounding terminal in the actuator of FIG. 1.
Figure 5B:
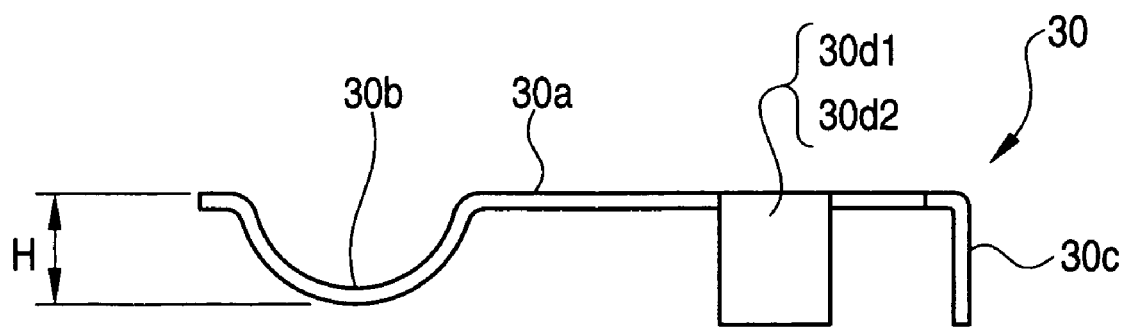
FIG. 5B is a side view of FIG. 5A.

The grounding terminal 30 is punched out of an elastic and electrically conductive metal plate, subjected to bending work and completed as shown in FIGS. 5A and 5B. Referring to FIGS. 5A and 5B, the grounding terminal 30 includes: a flat portion 30a having a rectangular configuration in plan view; a curved portion 30b longitudinally continuous with one end of the flat portion 30a, having the same width as the flat portion 30a and forming a half-circular line in side view; an extension portion 30c continuous with the other end of the flat portion 30a, having a smaller width than the flat portion 30a and downwardly bent perpendicular to the flat portion 30a; and positioning portions 30d1 and 30d2 extending respectively from sides of the flat portion 30a, having a width smaller than a lateral size of the flat portion 30a and downwardly bent perpendicular to the flat portion 30a. The extension portion 30c and the positioning portions 30d1 and 30d2, together with a part of the flat portion 30a (i.e., the flat portion among the extension portion 30c and the positioning portions 30d1 and 30d2), make up a snap-in mechanism adapted to snap-fittingly receive a printed board 22.

The grounding terminal 30 is put at a void portion of the front plate 20, which has a width slightly larger than a width W of the grounding terminal 30, such that the convex surface of the curved portion 5b makes contact with the outer stator yoke 5a, and then the printed board 22 is snapped into the snap-in mechanism comprising the extension portion 30c and the positioning portions 30d1 and 30d2 such that a land portion 22a (refer to FIG. 3) formed on the printed board 22 makes contact with the extension portion 30c, and the land portion 22a of the printed board 22 and the extension portion 30c of the grounding terminal 30 are soldered to each other for electrical continuity therebetween. They may be connected to each other via an electrically conductive resin, but soldering connection is preferred in view of a secure contact for a reliable electrical continuity.

After the ground terminal 30 is put as described above, the housing 21 is attached onto the front plate 20 so as to press the grounding terminal 30 against the first stator unit 3a thereby causing the curved portion 30b of the grounding terminal 30 to be deformed, which enables the grounding terminal 30 to make a secure contact with the outer stator yoke 5a for a reliable electrical continuity. For achieving the secure contact between the grounding terminal 30 and the outer stator yoke 5a, the grounding terminal 30 is set to have a height H larger than the thickness of the front plate 20. Thus, since the grounding terminal 30 is elastically lodged within the void portion of the front plate 20, the outside dimension of the actuator 1 is not influenced. The grounding terminal 30 is made of a material having an electrical conductivity and preferably elasticity as well, and beryllium copper is very suitable.

Figure 3:
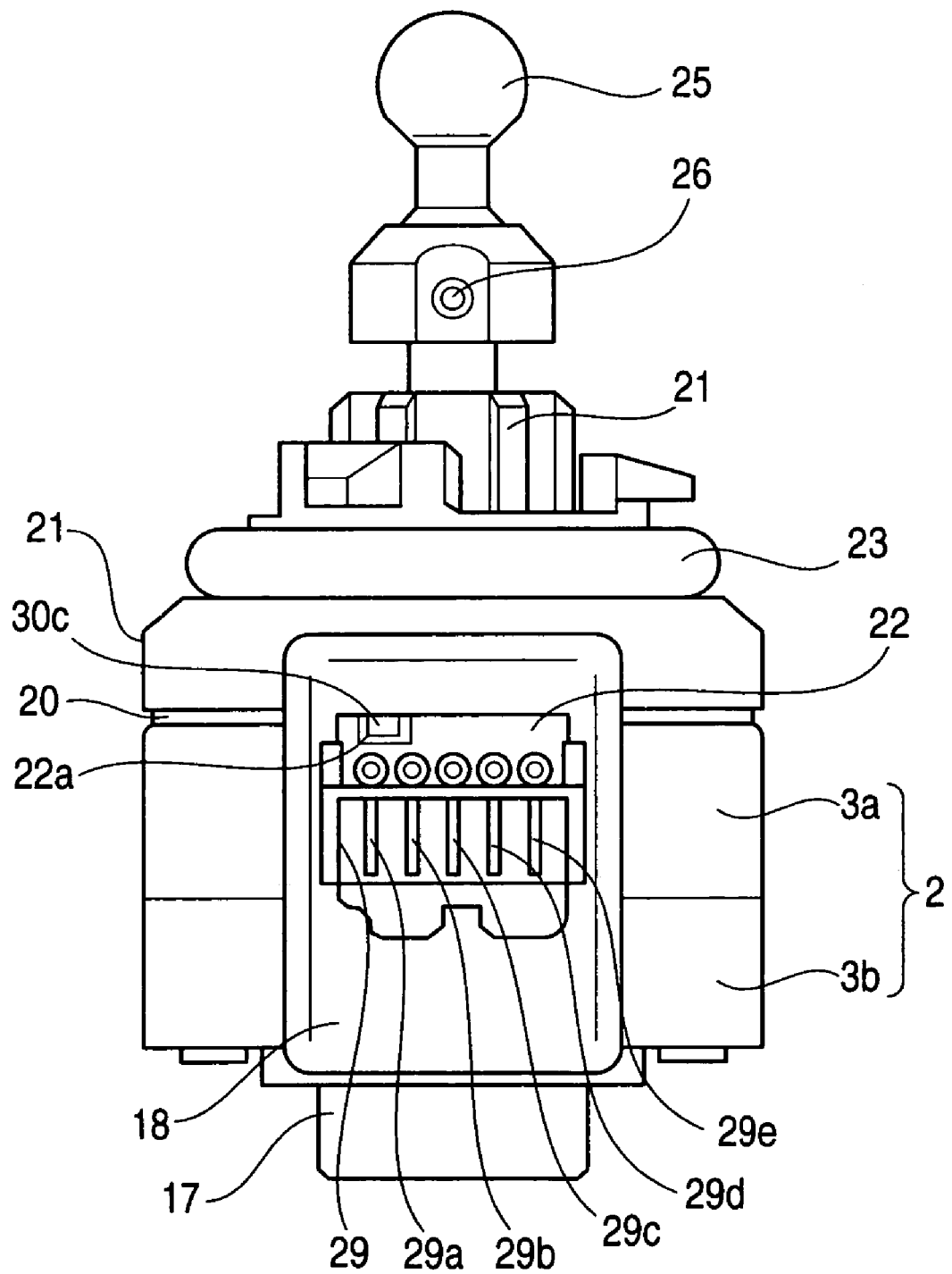
FIG. 3 is a side view of the actuator FIG. 1.
Figure 4:
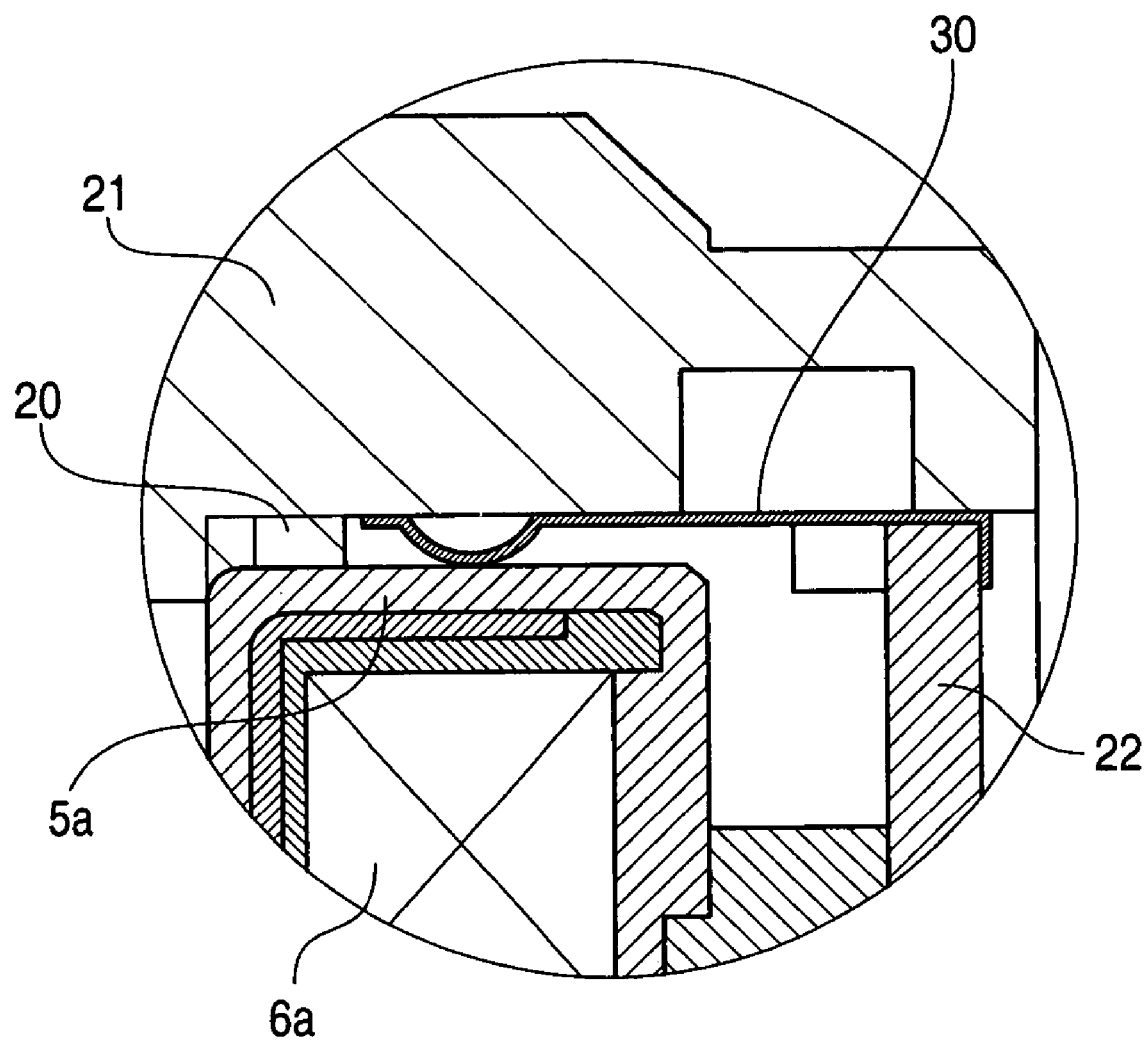
FIG. 4 is an exploded view of a portion indicated by B in FIG. 1.

Referring to FIG. 3, the land portion 22a is connected to a pin 29a of a connector 29 via either a wiring pattern or a wire for electrical continuity, and the pin 29a is connected to a grounding wire. Signal lines to apply current to the coils 6a and 6b are connected to other pins 29b to 29e of the connector 29, and the pins 29b to 29e are connected to a wire pattern formed on the printed board 22. Current is supplied to the coils 6a and 6b via coil terminals 28a and 28b inserted through holes of the wire pattern.

In the embodiment described above, the actuator 1 has the grounding terminal 30 configured as shown in FIGS. 5A and 5B, but the grounding terminal of the present invention does not have to be configured as shown FIGS. 5A and 5B and may be otherwise configured so as to firmly press on the outer stator yoke 5a for a reliable electrical continuity. Also, in the embodiment, the curved portion 30b occupies a part of the total longitudinal dimension of the grounding terminal 30, but the longitudinal dimension of the grounding terminal may alternatively be constituted totally by a curved portion. And, the curved portion may be substituted by a domed portion.

FIGS. 6A to 6D are side and top plan views of grounding terminals modified from the grounding terminal 30 described above with reference to FIGS. 5A and 5B.

Figure 6A:
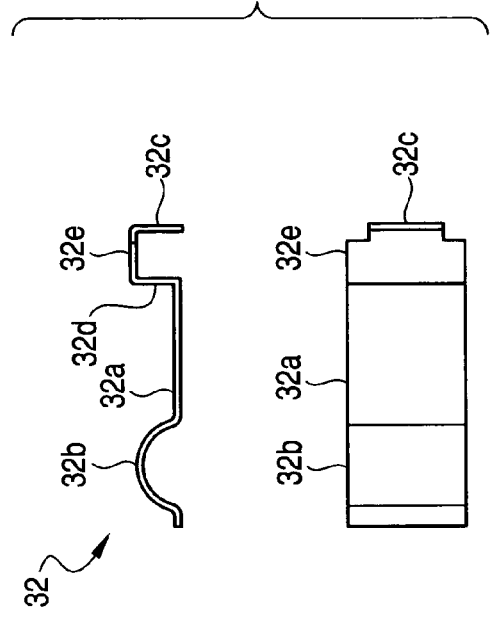
FIGS. 6A to 6D are structural views (each including plan and side views) of modified grounding terminals.

Referring to FIG. 6A, a grounding terminal 31 is made of a plate having elasticity and electrical conductivity, and includes: a curved portion 31b located at one end portion (left in the figure) thereof, forming a half-circular line in side view and having a convex side facing downward; a first flat portion 31a horizontally continuous from the curved portion 31b, and having a rectangular configuration in plan view; a first upright portion 31d downwardly continuous from the first flat portion 31a; a second flat portion 31e horizontally continuous from the first upright portion 31d; a second upright portion 31f upwardly continuous from the second flat portion 31e; a third flat portion 31g horizontally continuous from the second upright portion 31f; and an extension portion 31c located at the other end portion (right in the figure) thereof, downwardly continuous from the third flat portion 31g, and having a smaller width than the above-described other portions that have an identical width with one another.

The second upright portion 31f and the extension portion 31c, together with the third flat portion 31g, constitute a snap-in mechanism to snap-fittingly receive the printed board 22. Thus, the printed board 22 can be elastically held by the snap-in mechanism. And, when the grounding terminal 31 sits in place, the first flat portion 31a is brought into surface contact with part of the bottom of the housing 21, thus the grounding terminal 31 can be stably held between the upper stator yoke 5a and the housing 21.

Figure 6B:
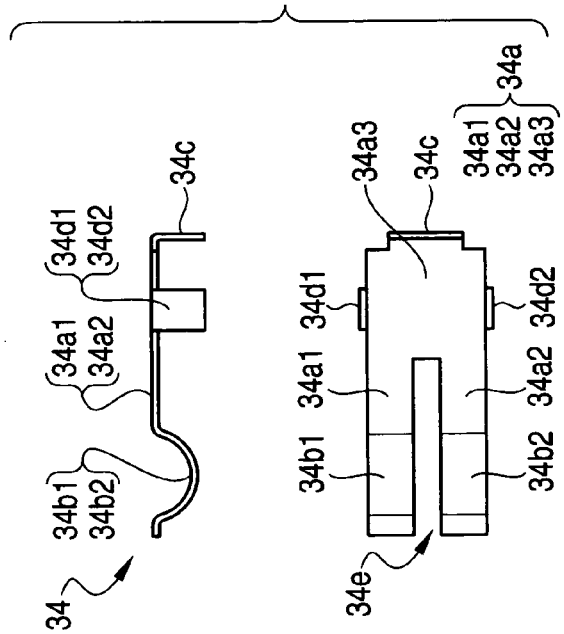

Referring to FIG. 6B, a grounding terminal 32 is made of a plate having elasticity and electrical conductivity, and includes: a curved portion 32b located at one end portion (left in the figure) thereof, forming a half-circular line in side view, and having a convex side facing upward; a first flat portion 32a horizontally continuous from the curved portion 31b, and having a rectangular configuration in plan view; an upright portion 32d upwardly continuous from first flat portion 32a; a second flat portion 32e horizontally continuous from the upright portion 32d; and an extension portion 32c located at the other end portion (right in the figure) thereof, downwardly continuous from the second flat portion 32e, and having a smaller width than the above-described other portions that have an identical width with one another. The upright portion 32d and the extension portion 32c, together with the second flat portion 32e, constitute a snap-in mechanism to snap-fittingly receive the printed board 22, and the printed board 22 can be elastically held by the snap-in mechanism. When the grounding terminal 32 sits in place, the first flat portion 32a is brought into surface contact with the upper stator yoke 5a, thus the grounding terminal 32 can be stably held between the upper stator yoke 5a and the housing 21.

Figure 6C:
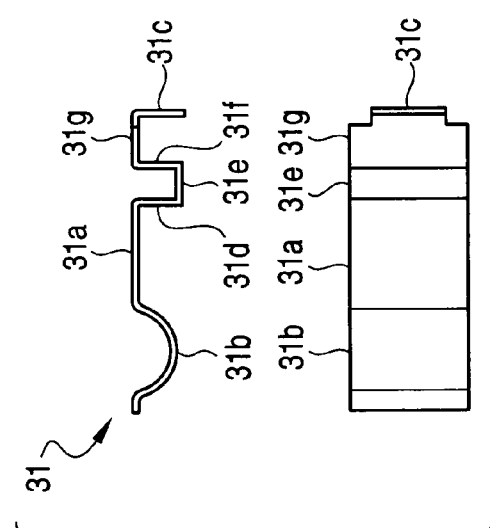

Referring to FIG. 6C, a grounding terminal 33 is made of a plate having elasticity and electrical conductivity, and includes: a first curved portion 33b1 located at one end portion (left in the figure) thereof, forming a U- or V-shaped line in side view, and having a convex side facing downward; a second curved portion 33b2 continuous from the first curved portion 33b1 and configured identical with the curved portion 33b1; a flat portion 33a continuous from the second curved portion 33b2, having a rectangular configuration in plan view, and having the same width as the first and the second curved portions 33b1 and 33b2; an extension portion 33c located at the other end portion (right in the figure) thereof, downwardly continuous from the flat portion 33, and having a smaller width than the flat portion 33a; and positioning portions 33d1 and 33d2 extending respectively from sides of the flat portion 33a, having a rectangular configuration in plan view, and downwardly bent perpendicular to the flat portion 33a: In this grounding terminal, additional curved portions 33bn may be provided as required.

Figure 6D:
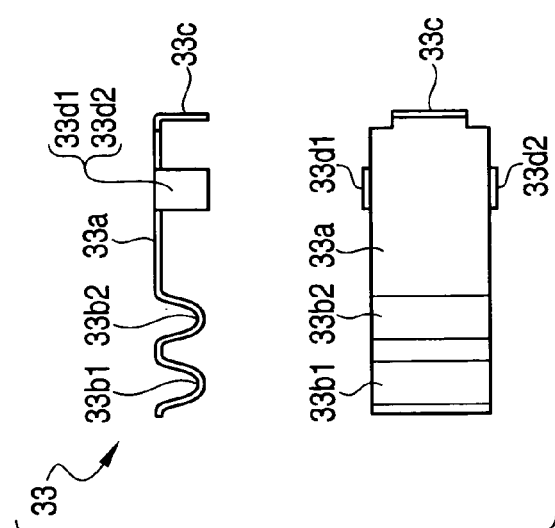

Referring to FIG. 6D; a grounding terminal 34 is structured similarly to the grounding terminal 30 described above with reference to FIGS. 5A and 5B and has substantially the same configuration in side view, but has a slit 34e which extends in the longitudinal direction, and which completely separates a curved portion into two sections and incompletely separates a flat portion into three sections so as to form a U-shape as a whole in plan view. Specifically, the grounding terminal 34 includes two curved portions 34b1 and 34b2 separated from each other by the slit 34e; a flat portion 34a including two separated sections 34a1 and 34a2 and a non-separated section 34a3; an extension portion 34c; and two positioning portions 34d1 and 34d2. Since the grounding terminal 34 has smaller surface areas of the curved portions and the flat portion than the grounding terminal 30, and therefore has smaller contact surface areas, the grounding terminal 34 can provide increased flexibility in application with dimensional changes compared to the grounding terminal 30.

Since any of the groundings terminal according to the present invention, for example the grounding terminal 30, is attached to the actuator 1 with its one end portion (specifically, the curved portion 30b) making an elastic contact with the outer stator yoke 5a of the stator assembly 2 and with the one end portion (specifically, the extension portion 30c) connected to the land portion 22a of the printed board 22, static electricity charged and electromagnetic noises can be conducted to a grounding wire through the grounding terminal 30.

Also, the printed board 22 is easily and firmly received in the snap-in mechanism of the grounding terminal 30, specifically by the extension portion 30c and the positioning portions 30d1 and 30d2, and soldering work can be easily applied to the land portion 22a while the printed board 22 is firmly held.

The grounding wire and the signal lines are twisted together, and the signal lines are shielded.

The printed board 22 can be accommodated in a limited space, and the coil terminals 28a and 28b, the grounding terminal 30, and the pins 29a to 29e of the connector 29 can be effectively connected to the printed board 22.

Discussion has been made with reference to an actuator provided with such a rotary-to-linear motion mechanism as to convert the rotary motion of a rotor unit into the linear motion of an output shaft. The present invention, however, is not limited to such an actuator and may be applied to any actuators that are provided with different modes of rotary-to-linear mechanisms, as long as the grounding terminal can be duly attached.

The present invention can be further applied to any equipments that include metal components resin-molded, for example, transformers and electromagnet devices, and that require removal of static electricity and external noises.

While the present invention has been particularly shown and described with references to embodiment thereof, it will be understood by those skilled in the art that various changes in form and details may be made therein without departing from the spirit and scope of the invention as defined by the appended claims.

The present application claims foreign priority based on Japanese Patent Application No. JP2004-175389, filed on Jun. 14 of 2004, the contents of which is incorporated herein by reference.

What is claimed is:

1. An actuator comprising:
a stator assembly comprising: a pair of stator yokes each having a plurality of pole teeth at an inner circumference thereof, and a coil comprising a wound magnet wire, the coil being disposed between the pair of stator yokes;
a rotor unit comprising a magnet at an outer circumference thereof, the rotor unit being disposed inside the stator assembly such that the magnet opposes the pole teeth of the stator assembly with a gap therebetween;
an output shaft disposed inside the rotor unit;
a housing;
a front plate disposed between the stator assembly and the housing;
a printed board having a land portion leading to a grounding wire; and
a grounding terminal having electrical conductivity and elasticity, the grounding terminal being disposed between the stator assembly and the housing such that: one end portion of the grounding terminal makes contact with one stator yoke of the pair of stator yokes, the one stator yoke being located closer to the housing; and the other end portion of the grounding terminal makes connection to the land portion of the printed board.

2. An actuator according to claim 1, wherein the grounding terminal is an electrically conductive and elastic plate, and the grounding terminal comprises: a flat portion; a curved portion continuous from one end of the flat portion, the curved portion making contact with the one stator yoke located closer to the housing; an extension portion perpendicularly continuous from the other end of the flat portion; a first positioning portion perpendicularly continuous from one side of the flat portion; and a second positioning portion perpendicularly continuous form the other side of the flat portion, and wherein the extension portion and the first and second positioning portions, together with a part of the flat portion, snap-fittingly receive the printed board such that the extension portion makes connection to the land portion of the printed board.

3. An actuator according to claim 2, wherein the curved portion comprises at least two segments each having one of U-shape and V-shape configurations.

4. An actuator according to claim 2, wherein the grounding terminal has a slit which separates the curved portion into two sections, and which causes the flat portion to comprise three sections such that a first section and a second section are separated from each other with a third section connecting to the first and second portions.

5. An actuator according to claim 1, wherein the grounding terminal is an electrically conductive and elastic plate, and the grounding terminal comprises: at least two flat portions comprising a first flat portion and a second flat portion; at least one upright portion each bridging two adjacent flat portions of the at least two flat portions; a curved portion continuous from an end of the first flat portion, the curved portion making contact with the one stator yoke located closer to the housing; and an extension portion perpendicularly continuous from an end of the second flat portion, and wherein the extension portion and one upright portion of the at least one upright portion, the one upright portion being located closer to the extension portion, together with the second flat portion, snap-fittingly receive the printed board such that the extension portion makes connection to the land portion of the printed board.

6. An actuator according to claim 1, wherein the grounding wire connected to the land portion of the printed board and signal lines are twisted together.

7. An actuator according to claim 1, wherein the grounding terminal is disposed within a void portion of the front plate so as to be duly accommodated between the stator assembly and the housing.

* * * * *